Patented Feb. 13, 1945

2,369,439

UNITED STATES PATENT OFFICE 2,369,439

REACTIONS BETWEEN ORGANIC NITROGEN COMPOUNDS AND REACTION PRODUCTS OF FORMALDEHYDE WITH SULPHAMATES

Martin Eli Cupery, Wilmington, Del., assignor to E. I. du Pont de Nemours & Company, Wilmington, Del., a corporation of Delaware No Drawing. Application March 8, 1941, Serial No. 382,338

4 Claims. (Cl. 260—6)

This invention relates to reactions involving formaldehyde derivatives of sulphamic acid salts and organic nitrogen compounds, particularly nitrogen compounds having a reactive hydrogen atom directly attached to a nitrogen atom, and to products resulting from such reactions.

Reactions of formaldehyde with organic amino, amido or imido compounds are widely used to prepare products which have found extensive commercial applications. Among the compounds so reacted with formaldehyde are urea, thiourea, and the like, melamine, and various proteins derived from both animal and vegetable sources. The present invention is concerned with reactions involving similar organic nitrogen-containing substances, employing in place of formaldehyde, reaction products of formaldehyde with sulphamic acid salts.

It is an object of the present invention to provide a method of reacting formaldehyde derivatives of sulphamic acid salts with organic nitrogen-containing substances, especially proteins and the like materials. A further object is to provide useful products, which products result from the reactions with which the present method is concerned. These and other objects will be apparent from the following description of the invention.

The above objects may be accomplished in accordance with the present invention by reacting a formaldehyde derivative of a salt of sulphamic acid, or of a substituted sulphamic acid, with an organic nitrogen-containing material having a reactive hydrogen atom directly attached to a nitrogen atom. It has been discovered that such reactions may be carried out in a practical manner to yield valuable products, which products appear to be true reaction products of the two reactants and not merely reaction products of formaldehyde with the nitrogen-containing compound.

The formaldehyde derivatives which are useful for practicing this invention are those which are prepared by reacting formaldehyde with a salt of sulphamic acid or a salt of a substituted sulphamic acid wherein one amino hydrogen atom of the sulphamic acid residue has been replaced by a hydrocarbon radical such as an alkyl, aryl, aralkyl or cyclo-paraffin group. Thus, formaldehyde reaction products with sulphamic acid salts of alkali metals, ammonia, amines, alkylol amines, copper, zinc, cadmium, the alkaline earth metals, and the like may be used. Such reaction products may be prepared in various ways. For example, they may be prepared by effecting the reaction in either an acidic or alkaline medium. The reactants will generally be employed in stoichiometrical proportions, i. e., one mol of formaldehyde for each sulphamic acid residue in the sulphamate, although an excess of either reactant may be used. The exact chemical structures of the formaldehyde-sulphamate reaction products are not definitely known, but it is possible that those prepared under acidic conditions are methylene sulphamates, or hydrates thereof, while those prepared under alkaline conditions are methylol compounds. But regardless of theories as to chemical structures, the products may all be used effectively for the present purpose. Particularly useful are the formaldehyde derivatives of alkaline earth metal sulphamates, especially calcium sulphamate, since they are generally more stable than, for example, the reaction products of formaldehyde with alkali metal sulphamates. When preparing these reaction products under acidic conditions, a reaction medium which is too strongly acidic, i. e., having a pH below about 2, should be avoided, although the minimum pH which can be tolerated will depend upon the particular sulphamate being reacted. A reaction medium having a pH of about 4 to near neutrality generally gives best results. When preparing reaction products under alkaline conditions, reaction media having a pH above about 11 are not generally recommended, a pH of about 8 to 10 being preferred, as described in copending application Serial No. 358,521, filed September 26, 1940, by Joseph Frederic Walker, now Patent No. 2,321,958. The term "alkaline earth metals" is used to include magnesium along with such metals as calcium, strontium, and barium.

The organic nitrogen-containing substances which may be reacted with the above formaldehyde derivatives in accordance with the present invention are those which contain at least one reactive hydrogen atom directly attached to a nitrogen atom of the molecule. Thus, organic substances or compounds which contain an amino, amido, or imido group may be useful. Specific examples of such substances are methyl, dimethyl, dipropyl, phenyl methyl and other aliphatic and aromatic primary and secondary amines; melamine, formamide, acetamide, urea, urea-formaldehyde reaction products, e. g. methylol ureas and resins, thiourea, and the like; and proteins and protein-like material such as gelatin, glue, casein, soya bean protein, zein, powdered blood, hide powder and the like. Such animal products as hides, flesh, fur, wool, etc., which contain substantial quantities of proteins, are also included.

Reaction between the formaldehyde derivative and the organic nitrogen-containing material may be effected by mixing together the two reactants in the solid state and then subjecting the mixture to heat, under pressure if desired. They may also be reacted in solution, or in the case of a solid nitrogen-containing material such as a molten protein article, such a material may be contacted with a solution of the formaldehyde sulphamate derivative under conditions suitable for effecting the desired reaction.

The following examples are illustrative of the invention.

Example 1

Four compositions containing reaction products of ammonium sulphamate with formaldehyde were prepared by dissolving 0.5, 1, 2, and 2.5 mols of ammonium sulphamate per mol of formaldehyde contained in four portions of an aqueous 37% formaldehyde solution. Reaction was initiated by heating the mixtures to 50° C. After the exothermic reaction had subsided, a water-soluble paste resulted in all but the first solution. 2.5 gram portions of these compositions were added to four solutions, each of which was prepared by dissolving 10 grams of a commercial flake glue in 20 cc. of water at 49° C. The times required for the resulting glue solutions to gel are given below.

| Ratio ammonium sulfamate to formaldehyde in composition added | Gelling time for glue bath |
| --- | --- |
| 0.5 | 1 hour. |
| 1.0 | 2 hours. |
| 2.0 | 3 hours 55 minutes. |
| 2.5 | 5 hours 5 minutes. |

The pH of the ammonium sulphamate formaldehyde compositions which were added to the glue solutions varied from 1.1 for the composition containing the least sulphamate to 3.8 for the one containing the most sulphamate.

Example 2

One gram of a formaldehyde derivative of sodium sulphamate prepared by the procedure described in Example 1 of German Patent 209,502 was dissolved in 20 cc. of a water solution containing 10 grams of glue. The resultant solution gelled on standing for 3¼ hours at a temperature of 49° C. Samples of maple wood bonded together with this glue by hot pressing for one hour at 100° C. and 200 lbs. pressure showed a good degree of water-resistance.

Example 3

A 10 gram sample of rennet casein was moistened with an aqueous solution prepared by dissolving 0.5 grams of a reaction product of copper sulphamate with ordinary 37% aqueous formaldehyde, in 4 cc. of water. A second casein sample was moistened with a similar solution of a reaction product of ordinary aqueous formaldehyde with zinc sulphamate and a third sample was moistened with a similar solution of a reaction product of formaldehyde with cadmium sulphamate. Each of the samples was then subjected to compression molding at 125° C. at a pressure of 2,000 lbs. per sq. inch. There resulted translucent, homogeneous, molded chips which did not lose shape or show appreciable changes in dimensions after soaking for 8 days in water. There was no disintegration at the surface of the chips as is generally the case when unmodified casein moldings are subjected to similar treatment.

Example 4

Three 10 gram samples of fresh, chopped beef were placed in open bottles. To one bottle was added 20 cc. of water, to another 20 cc. of a 1% aqueous solution of a formaldehyde-calcium sulphamate reaction product prepared under alkaline conditions, and to the third bottle was added 20 cc. of a 1% aqueous solution of formaldehyde. The bottles were placed in a warm room for three days, after which time the meat in the bottle containing water had putrified, whereas the other samples of meat had not. The meat treated with the formaldehyde-calcium sulphamate reaction product retained the original faint odor of fresh meat, whereas the sample treated with formaldehyde had the characteristic irritating odor of formaldehyde. Even after six weeks' storage no decomposition or putrefaction of the treated samples could be observed.

Example 5

Twenty grams of rennet casein were thoroughly moistened with 5 grams of water and 3 grams of 45% methanol solution of a reaction product of calcium sulphamate with formaldehyde, which reaction product had been prepared under alkaline conditions. This mixture was then placed in a compression mold and heated under a pressure of 4,000 lbs. per sq. inch at approximately 160° C. for 15 minutes. On cooling, a clear, translucent, homogeneous molding was obtained. The product upon removal from the mold was somewhat plastic and could be easily cut with a knife. After standing for several hours, it became hard and tough. The material did not crack or check on storage and was not disintegrated on prolonged soaking in water. A blank sample obtained from a similar casein charge moistened with 8 grams of water did not set up in the mold and considerable extrusion took place when pressure was applied. The product, though clear and translucent, gradually disintegrated on soaking in water and checked and cracked on storage.

Example 6

Ten grams of rennet casein were moistened with a solution of 0.5 gram of a calcium sulphamate-formaldehyde reaction product, prepared under alkaline conditions, dissolved in 4 cc. of water. This mixture was then compressed for 15 minutes at 125° C. under a pressure of 2,000 lbs. per sq. inch. The molded chip prepared in this way showed no change of dimensions after soaking in water for 8 days.

Molded casein products similar in properties to those of the product of Example 6 were prepared by the method of Example 6 using reaction products, prepared under alkaline conditions, of formaldehyde with magnesium and strontium sulphamates.

Example 7

One gram of the calcium sulphamate-formaldehyde reaction product used in Example 6 was dissolved in a solution of 10 grams of glue in 20 grams of water maintained at 49° C. Samples of maple wood were glued together with the modified glue and hot pressed for one hour at 100° C. under 200 lbs. pressure. Control samples of bonded wood using unmodified glue were prepared in the same manner. Strength tests of the bonded wood showed that the modified glue possessed better than twice the bonding strength of the unmodified glue and was superior to glue modified with paraformaldehyde, alone. On soaking in water for one week, the joints bonded with the modified glue were still intact and possessed a fair degree of strength whereas the joints bonded with unmodified glue had soaked apart. Good results were also obtained when the joints were cold pressed at 200 lbs. pressure.

*Example 8*

A solution of soya bean alpha-protein was prepared by dispersing 8.0 grams of the protein in 64 cc. of water by means of caustic soda and boric acid. To this solution was added 1.44% by weight of a 40% solution of a calcium sulphamate-formaldehyde reaction product prepared under alkaline conditions. On standing at room temperature this solution became viscous and gelled in 8 to 12 days. Such a composition may be used for coating and impregnating purposes.

*Example 9*

A protein paint was prepared by dispersing soya bean alpha-protein in water by means of caustic soda and boric acid. A small amount of a softening agent was added, a commercial grade of coating clay was dispersed throughout the mixture, and then there was added a calcium sulphamate-formaldehyde reaction product, prepared under alkaline conditions, in an amount corresponding to 10% by weight, based on the weight of the protein present. The weight precentages of protein and clay in the final composition were 6.3 and 41% respectively.

The calcium sulphamate-formaldehyde product was an excellent insolubilizer for the protein in the above paint composition. The composition did not gel even after standing for three weeks at room temperature. When applied to a wall paper base, followed by drying, the composition yielded an excellent water-resistant coating. Although drying the coated sheet at ordinary temperature gave a paper having definite water resistance, subjection of the coated paper to a final calendering treatment at elevated temperature or to a baking treatment, e. g. at 95° to 110° C. for 0.5 hour, markedly increased water resistance, and such after-treatment is preferred. Coated paper prepared using the above paint composition was distinctly more water-resistant than coated paper prepared under the same conditions using the same type of coating composition except that it contained paraformaldehyde in place of the calcium sulphamate-formaldehyde reaction product. Furthermore, the composition containing paraformaldehyde had an objectionable odor of formaldehyde and set to a gel upon standing for four to twenty-four hours. Such rapid gelling of compositions containing paraformaldehyde is disadvantageous in that it necessitates using the paint within a relatively short time after preparation. On the other hand, a composition such as that described above may be stored after preparation for as long as three weeks without gelling taking place.

*Example 10*

Ten grams of soya bean alpha-protein were moistened with two grams of a 45% alcoholic solution of a calcium sulphamate-formaldehyde reaction product, prepared under alkaline conditions, and 4 cc. of water, then subjected to a pressure of 5,000 lbs. per sq. inch at 125° C. for 15 minutes. For comparison a similar compression casting was made with 10 grams of alpha-protein moistened with 6 grams of water. The calcium sulphamate-formaldehyde reaction product hardened the protein in the casting process and a clear translucent product was obtained. The unmodified protein did not set up in casting and most of it extruded from the mold. The modified casting did not check on aging, whereas the control showed pronounced checking.

*Example 11*

A reaction product of formaldehyde with calcium sulphamate, prepared at a pH of 8–10 and isolated in solid form, was reacted with urea by heating the reactants in an aqueous solution. There resulted a clear, water-soluble resin. On boiling down, the solution of resin became extremely viscous and finally hardened to a colorless, glass-like solid. In another experiment equimolar quantities of the same two reactants were heated with a small amount of water. The product obtained was an effective adhesive for wood.

*Example 12*

Equimolar quantities of melamine and a calcium sulphamate-formaldehyde reaction product prepared under alkaline conditions, employing 2 mols of formaldehyde per mol of sulphamate, were dissolved in a small amount of water. On gently heating the resulting solution, it was concentrated to a clear water-soluble resin.

Although the reactions with nitrogen-containing compounds with which the present invention is concerned may be carried out under either alkaline or acidic conditions, it is preferred to effect such reactions under substantially neutral or alkaline conditions, e. g., at a pH of about 6–12, preferably 8–10. This is particularly true when the reactions are carried out in solution. In the case of reactions involving protein materials, acidic conditions should be avoided as much as possible in order to prevent undue degradation of the protein. The reactions may be effected merely by permitting the reactants to stand in contact with each other at room temperatures for a sufficient period of time or they may be actively promoted by the application of heat. Temperatures above room temperature and as high as about 200° C. are suitable for so promoting the reaction. Ordinarily, temperatures within the range of from 80–110° C. are preferred since at such temperatures there is little tendency for degradation of products such as proteins to occur.

Compositions, either solid or liquid, which contain products prepared in accordance with this invention may also contain such substances as fillers, softening agents, modifiers and the like which find wide use in preparing similar compositions containing reaction products of formaldehyde with proteins, urea, etc.

The formaldehyde derivatives of alkaline earth metal sulphamates, particularly calcium sulphamate, are especially well suited for effecting reactions with organic nitrogen-containing materials of the type here concerned. As a general rule they are much more stable than other products, for example formaldehyde reaction products with alkali metal sulphamates.

In practicing the invention it is not necessary that a preformed formaldehyde-sulphamate reaction product be employed since good results may be obtained by adding formaldehyde and the sulphamate to the organic nitrogen-containing material. Under such conditions the action of formaldehyde upon, for example, a protein, is substantially modified by the presence of the sulphamate. A probable explanation of this fact is that there first occurs a reaction between the formaldehyde and the sulphamate to form a reaction product thereof, which reaction product then further reacts with the protein. However, it may be that all three materials react simultaneously with each other. It is to be understood that any combination of reagents which would lead to the formation of a reaction product of formaldehyde with a sulphamate in the presence of an organic nitrogen compound of the type herein specified is within the scope of the invention. Such combinations might include the addition of, for example, sulphamic acid or a sulphamate to an alkaline dispersion of a protein, followed by the addition of formaldehyde, paraformaldehyde or any substance yielding formaldehyde under the conditions of use. If desired, sulphamic acid or a salt thereof may be added simultaneously with formaldehyde to such an alkaline dispersion of a protein, or as previously indicated, the preformed formaldehyde-sulphamate reaction product may be added to the protein composition.

The present invention may be practiced employing various amounts of the formaldehyde-sulphamate derivative. In general when the reaction involves a protein material or composition, it is preferred to employ in the neighborhood of 1 to 25% by weight of the formaldehyde derivative, based on the protein. Larger amounts may be used if desired, especially in the case of reactions involving such substances as urea and the like, in which case equimolar amounts of the reactants will generally be used although an excess of one or the other obviously may be employed if desired.

The present formaldehyde-sulphamate reaction products, in addition to their use in reactions involving ordinary protein materials such as glue, casein, soya bean protein, and the like, may be employed as embalming, tanning, or deodorizing agents, inasmuch as such uses are practical applications of protein modifications in which the stability, water-resistance or other property of the protein material is improved by action of the formaldehyde-sulphamate derivative.

Reactions between the nitrogen-containing compounds of the type herewith concerned and formaldehyde-sulphamate products, appear to involve the latter compounds as such and not merely formaldehyde which has been liberated therefrom. This appears to be the case especially when reaction with the nitrogen-containing compound is carried out under alkaline conditions. The nature of the reactions involved is not clear but indications are that the formaldehyde-sulphamate products act as cross-linking agents. They apparently do not function merely as agents for liberating formaldehyde in the reaction media, since the odor of formaldehyde is usually not apparent during reactions with the nitrogen compounds. This is almost exclusively the case when the reactions are effected under alkaline conditions. When the reaction with the nitrogen-containing compound is effected under slightly acidic conditions, there may be a tendency for some formaldehyde to be liberated, but it is believed that in general the formaldehyde-sulphamate product reacts as an entity, even under slightly acidic conditions.

One advantage in using, for example, the formaldehyde derivative of calcium sulphamate or other similar formaldehyde derivatives, as protein modifying agents, is that such a compound possesses no formaldehyde odor. Ordinarily formaldehyde, or such other protein modifiers which evolve free formaldehyde during use, are quite objectionable due to the irritating nature of the evolved formaldehyde vapors. When using the present formaldehyde derivatives, especially under alkaline conditions, the odor of formaldehyde is usually not detectable even when, for example, the protein composition to which has been added substantial amounts of the formaldehyde derivative is heated at elevated temperatures. A further advantage attending the use of the present formaldehyde derivatives is that solutions thereof have comparatively little tanning action upon the human skin at ordinary temperatures. In contrast, formaldehyde is known to have an objectionable tanning action upon the hands of workers handling it.

Many of the formaldehyde-sulphamate products are very soluble in water. This facilitates the preparation of homogeneous protein compositions containing the formaldehyde derivative, thus making it possible to bring about complete reaction of all of the sulphamate derivative with all of the protein. Paraformaldehyde has been used for insolubilizing glue and similar proteins, but due to its insolubility in compositions of such materials, such use of paraformaldehyde has been limited. Because of its limited solubility it is practically impossible to distribute paraformaldehyde uniformly throughout a protein composition before hardening occurs, the result being that reaction with the protein is not uniform throughout.

Formaldehyde reacts almost instantaneously with proteins, while the present formaldehyde derivatives generally react more slowly so that better control of reactions is possible. Thus a hot compression molding prepared from rennet casein moistened with ordinary formaldehyde solution is a loose conglomerate of insolubilized granules. In contrast, molded products obtained in Examples 3, 5, 6, and 10 are homogeneous throughout and generally clear, translucent, and strong, since insolubilization of the protein by the present method does not take place until the protein has melted or dissolved.

By controlling the alkalinity of the reaction mixtures, controlled insolubilization or modification of proteins by means of the present formaldehyde derivatives is possible. This is particularly true when the reactions involved are carried out at substantially neutral or alkaline conditions. This is distinctly advantageous. When using formaldehyde as a protein hardening agent, it is generally considered that the use of an acid such as oxalic acid or the like is necessary to inhibit the action of the formaldehyde or paraformaldehyde. However, since solutions or dispersions of proteins such as casein and soya bean proteins are formed under substantially neutral or alkaline conditions the addition of an acid to such a composition will tend to precipitate a certain amount of the protein. The precipitated material is generally in the form of a powder having little water resistance, even though the individual particles have been insolubilized by the action of formaldehyde. When using formaldehyde-sulphamate derivatives in accordance with the present invention, it is not necessary to employ an acid to inhibit action on the protein, and such derivatives in general react relatively slowly and cause the formation of a continuous water-resistant gel which leaves a resinous water-resistant layer or film upon evaporation.

It should be noted that not all of the present formaldehyde-sulphamate derivatives may be used under alkaline conditions. Such derivatives of zinc, copper, and cadmium sulphamates are generally decomposed under neutral or alkaline conditions so that their use is restricted to acidic or slightly acidic conditions.

As many different modifications of the invention may be made without departing from the spirit and scope thereof, it is to be understood that the invention is not to be limited to the details of the foregoing description and examples, which are intended to be illustrative only, except as indicated in the appended claims.

I claim:
1. The method which comprises reacting the reaction product of formaldehyde and a salt of sulphamic acid with a protein, said reaction being effected by the application of heat.
2. The method which comprises reacting the reaction product of formaldehyde and calcium sulphamate with a protein, said reaction being effected by the application of heat.
3. The product produced by reacting a protein with the reaction product of formaldehyde and calcium sulphamate, said reaction being effected by the application of heat.
4. The product obtained by reacting a protein with the reaction product of formaldehyde and a salt of sulphamic acid, said reaction being effected by the application of heat.

MARTIN ELI CUPERY.